March 31, 1925.
A. BONIME
1,532,030
MIRROR FOR POCKETBOOKS AND THE LIKE
Filed Dec. 31, 1924
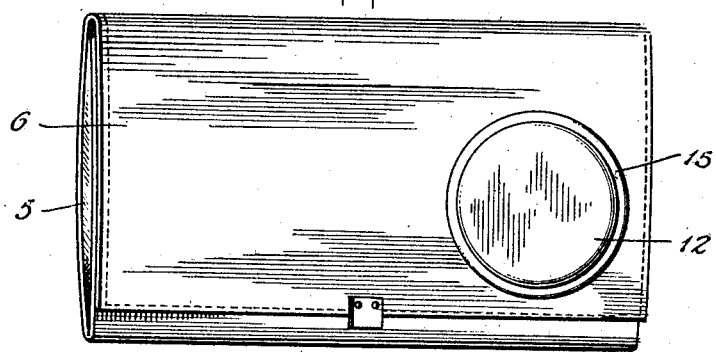
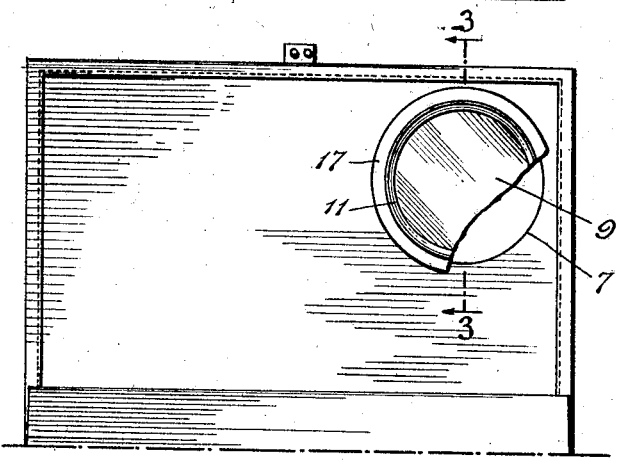
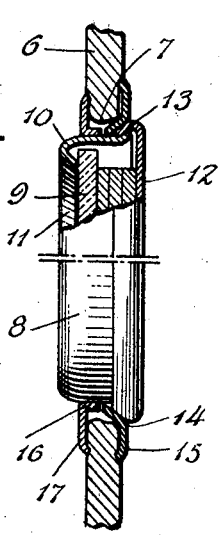
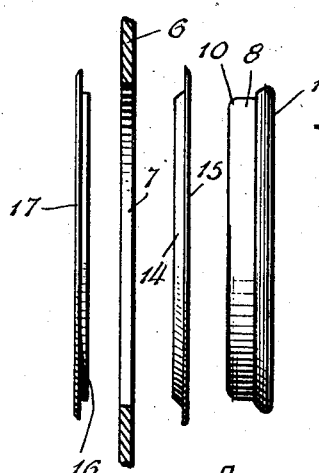
INVENTOR
ALBERT BONIME
BY
ATTORNEYS Patented Mar. 31, 1925.

1,532,030

UNITED STATES PATENT OFFICE.

ALBERT BONIME, OF NEW YORK, N. Y.

MIRROR FOR POCKETBOOKS AND THE LIKE.

Application filed December 31, 1924. Serial No. 759,055.

*To all whom it may concern:*

Be it known that I, ALBERT BONIME, a citizen of the United States, residing at New York city, borough of Bronx, county of Bronx, and State of New York, have invented certain new and useful Improvements in Mirrors for Pocketbooks and the like, of which the following is a specification.

This invention relates to improvements in mirrors for pocketbooks and the like and has particular reference to a mounting for the mirror.

An object of the invention is to provide an improved mounting utilized for attaching a mirror to a pocketbook or like article in such manner that the mirror will be securely held in place and prevented from accidental detachment from the pocketbook.

Another object is the provision of a mounting of simple and inexpensive construction by means of which a mirror may be easily and quickly secured in position.

The above and other objects will appear more clearly from the following detailed description, when taken in connection with the accompanying drawing, which illustrates a preferred embodiment of the inventive idea.

In the drawing—

Figure 1 is a front elevation of a pocketbook showing a mirror mounted therein in accordance with the present invention;

Figure 2 is a fragmentary view showing a cover of the pocketbook in open position with the mirror in place;

Figure 3 is an enlarged section on the line 3—3 of Figure 2; and

Figure 4 is a view with the mirror and the mounting therefor disassembled.

Although the invention is shown in connection with a foldable pocketbook, it will, of course, be understood that the same may be applied to other articles of a similar nature with equal facility without departing from the spirit or scope of the invention.

In the drawing the numeral 5 indicates a pocketbook having the usual foldable cover 6 upon which the mirror is mounted so as to be in a convenient position for use when the cover 6 is moved to an open position. In carrying out the invention the material forming the cover 6 of the pocketbook is cut to provide an opening 7 shaped to conform substantially to the contour of the mirror which is to be mounted in the cover.

As shown the mirror includes a body 8 of circular formation in which is mounted in the usual manner the glass 9. The outer periphery or wall of the body 8 is tapered adjacent one edge thereof, as indicated at 10, and then rounded and bent over to provide a retaining flange 11 for the glass 9. Secured to the opposite edge of the body is a back 12 which is visible when the pocketbook is closed, as in Figure 1, and which may be provided with any suitable design. The edge of the back 12 is bent to provide a bead 13 which engages the body 8 to secure the back thereto.

When mounting the body 8 in position on the cover 6 an outer clamping ring 14 is first fitted over the tapered portion 10 of the body 8 and then forced toward the back 12 until the ring snugly engages the wall of said body and the bead 13, it being understood that the interior diameter of the ring 14 is slightly less than that of the greatest diameter of the body 8. The body 8 is then inserted into the opening 7 in the material to the position shown in Figure 3, in which position an annular facing flange 15 of the ring 14 overlaps and engages the outer face of the portion of the material of the cover 6 surrounding the opening 7. After this operation has been completed a second clamping ring 16 is fitted over the tapered portion 10 and engaged with the outer periphery or wall of the body 8. The interior of the clamping ring 16 is also slightly less than the exterior diameter of the body 8 so that when the clamping ring 16 is forced down on the body 8, by means of a die or other suitable stamping device, the same will snugly fit the body. The ring 16 is also provided with an annular facing flange 17 which, when the ring is forced into engagement with the body 8, will overlap and surround the inner face of the material of the cover 6 surrounding the opening 7 and will cooperate with the ring 14 and its annular flange 15 to clamp the material of the cover 6 therebetween and thus securely attach the mirror to the cover. It will thus be seen that the rings 14 and 16 will securely maintain the mirror body in position on the cover and that the flanges 15 and 17 of said rings will effectively overlap the portions of the cover surrounding the opening therein so that no portion of the opening itself will be visible when the mirror is in place.

What is claimed is:

1. A mounting for mirrors capable of attachment to pocketbooks and the like including a mirror body adapted to be inserted through an opening formed in the pocketbook, a clamping ring fitted over said body in snug engagement therewith and including a facing flange overlapping and engaging one side of the material forming the edge of said opening, and a second clamping ring also fitted over said body in snug engagement therewith and including a facing flange overlapping and engaging the other side of the material forming the edge of said opening and cooperating with the first named ring to secure the mirror body in position in said opening.

2. A mounting for mirrors capable of attachment to pocketbooks and the like including a mirror body the outer peripheral surface of which is tapered adjacent one edge, a back for said body including a bead surrounding the opposite edge of the body, said body adapted to be inserted through an opening formed in the pocketbook, a clamping ring capable of being loosely fitted over the tapered portion of said body and moved into snug engagement with the other portion thereof and with said bead, said ring having a facing flange overlapping and engaging one side of the portion of the material of the pocketbook surrounding said opening, and a second clamping ring also loosely fitted over said tapered portion and capable of being forced into snug engagement with said other portion and having a facing flange overlapping and engaging the opposite side of the material surrounding said opening.

In testimony whereof I have affixed my signature.

ALBERT BONIME.